(12) United States Patent
Murakami

(10) Patent No.: US 12,736,004 B2
(45) Date of Patent: Sep. 15, 2026

(54) SADDLE-TYPE VEHICLE WITH EXHAUST PIPE CATALYST ARRANGEMENT

(71) Applicant: KAWASAKI MOTORS, LTD., Akashi (JP)

(72) Inventor: Kaoru Murakami, Hyogo (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/897,329

(22) Filed: Sep. 26, 2024

(65) Prior Publication Data

US 2025/0109703 A1 Apr. 3, 2025

(30) Foreign Application Priority Data

Sep. 28, 2023 (JP) ................................ 2023-168500

(51) Int. Cl.

*F01N 13/00* (2010.01)
*B62K 11/02* (2006.01)
*F01N 3/10* (2006.01)

(52) U.S. Cl.

CPC ............ *F01N 13/009* (2014.06); *B62K 11/02* (2013.01); *F01N 3/10* (2013.01); *F01N 13/0093* (2014.06); *F01N 13/0097* (2014.06); *F01N 2230/04* (2013.01); *F01N 2260/20* (2013.01); *F01N 2340/04* (2013.01); *F01N 2470/18* (2013.01); *F01N 2560/025* (2013.01); *F01N 2590/04* (2013.01)

(58) Field of Classification Search

CPC ...... F01N 3/10; F01N 13/009; F01N 13/0093; F01N 2230/04; F01N 2260/20; F01N 2340/04; F01N 2470/18; F01N 2560/025; F01N 2590/04

USPC ............................................................ 60/299

See application file for complete search history.

(56) References Cited

U.S. PATENT DOCUMENTS 9,016,422 B2 * 4/2015 Hayama ................ B62K 11/00 181/227
2007/0102224 A1 * 5/2007 Harada ................ F01N 13/011 180/309

(Continued)

FOREIGN PATENT DOCUMENTS

EP 1643095 A1 * 4/2006 ............ F01N 13/18
EP 3524501 A1 * 8/2019 ............ B62K 11/00

(Continued)

*Primary Examiner* — Laert Dounis
(74) *Attorney, Agent, or Firm* — PROCOPIO, CORY, HARGREAVES & SAVITCH LLP

(57) ABSTRACT

There is provided a straddle-type vehicle including: a vehicle body frame including an engine mounting frame; an internal combustion engine having an intake port and an exhaust port; a swing arm extending rearward from the engine mounting frame and having a front end portion pivotally supported by a pivot shaft at a rear portion of the engine mounting frame; a rear wheel connected to a rear end portion of the swing arm; and an exhaust assembly including an exhaust pipe connected to the exhaust port, a muffler connected to the exhaust pipe, and a catalyst housed in an intermediate portion of the exhaust pipe on an upstream side of the muffler. The pivot shaft is disposed higher than a lower portion of the engine mounting frame. The catalyst is disposed in front of the rear wheel, behind the internal combustion engine, and below the swing arm.

10 Claims, 9 Drawing Sheets

(56) References Cited

U.S. PATENT DOCUMENTS

2007/0277517 A1* 12/2007 Yamakura ............. F01N 3/2885
60/323
2009/0165448 A1* 7/2009 Mitsukawa ........... F01N 3/2885
60/299
2009/0166115 A1* 7/2009 Mizutani ............... F01N 3/2885
280/124.1
2016/0245147 A1* 8/2016 Hayama .................... F01N 1/00

FOREIGN PATENT DOCUMENTS

JP 3740879 B2 * 2/2006 ............ F01N 13/011
JP 2019-194449 A 11/2019
WO WO-2018030110 A1 * 2/2018 ............... B62H 1/02
WO WO-2018061120 A1 * 4/2018 ............... F01N 1/08

* cited by examiner

L9
50
53
49c
L10
51
49b
52c
48
L11
54
52b
47
52a
49a

SADDLE-TYPE VEHICLE WITH EXHAUST PIPE CATALYST ARRANGEMENT

CROSS-REFERENCE TO RELATED APPLICATIONS

This application is based on and claims priority under 35 USC 119 from Japanese Patent Application No. 2023-168500 filed on Sep. 28, 2023, the contents of which are incorporated herein by reference.

TECHNICAL FIELD

The present disclosure relates to a straddle-type vehicle having an exhaust pipe in which a catalyst is housed.

BACKGROUND ART

JP2019-194449A discloses a straddle-type vehicle that includes an exhaust pipe extending downward from an internal combustion engine and then extending rearward in a front-rear direction of the vehicle. The straddle-type vehicle according to JP2019-194449A has an exhaust system that includes a catalyst for purifying an exhaust gas inside an exhaust pipe and an exhaust gas sensor for detecting characteristics of the exhaust gas.

However, in the straddle-type vehicle disclosed in JP2019-194449A, the exhaust pipe extends downward from the internal combustion engine and then extends along the front-rear direction of the vehicle, and thus there is a possibility that a space for disposing the catalyst is limited. Therefore, there is a possibility that the size of the disposed catalyst is limited, and the purification performance of the exhaust gas may be limited accordingly.

SUMMARY OF INVENTION

Therefore, The present disclosure provides a straddle-type vehicle capable of improving a degree of freedom in layout for a space in which a catalyst is disposed.

According to an illustrative aspect of the present disclosure, a straddle-type vehicle includes: a vehicle body frame including an engine mounting frame; an internal combustion engine mounted on the engine mounting frame and having an intake port and an exhaust port; a swing arm extending rearward from the engine mounting frame and having a front end portion pivotally supported by a pivot shaft at a rear portion of the engine mounting frame; a rear wheel connected to a rear end portion of the swing arm; and at least one exhaust assembly including an exhaust pipe connected to the exhaust port of the internal combustion engine, a muffler connected to the exhaust pipe, and at least one catalyst housed in an intermediate portion of the exhaust pipe on an upstream side of the muffler. The pivot shaft is disposed higher than a lower portion of the engine mounting frame. The catalyst is disposed in front of the rear wheel, behind the internal combustion engine, and below the swing arm.

According to the present disclosure, the catalyst is disposed in a space that is disposed in front of the rear wheel, behind the engine mounting frame, and below the swing arm, and thus even when a catalyst large in size is used, a degree of freedom in layout relating to the catalyst can be improved.

DESCRIPTION OF EMBODIMENTS

Hereinafter, a straddle-type vehicle according to an embodiment will be described with reference to the accompanying drawings. In the present specification, a front-rear direction, a left-right direction (a lateral direction), and an upper-lower direction refer to directions viewed from a rider when the rider sits on the vehicle.

First Embodiment

Figure 1:
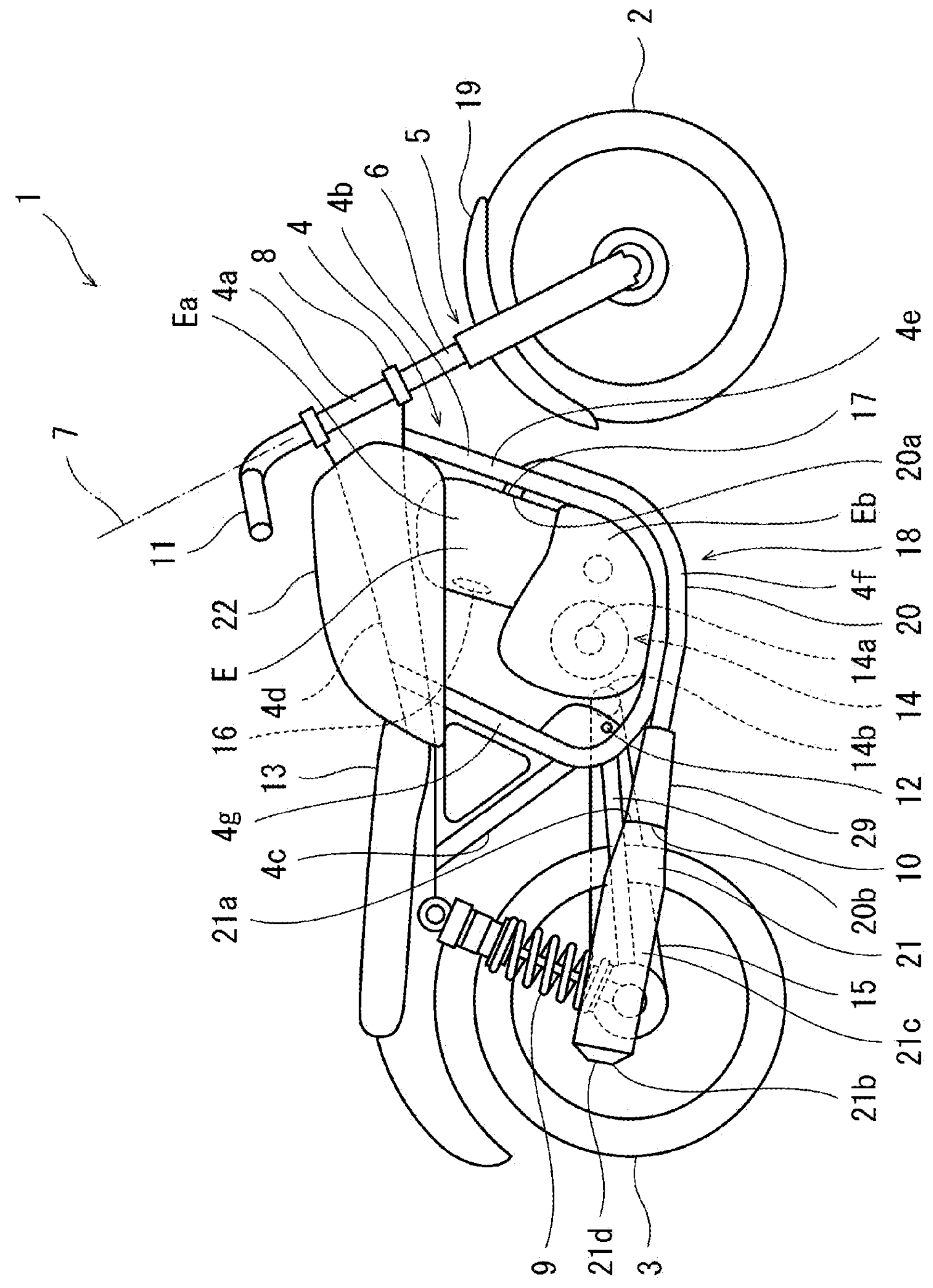
FIG. 1 is a side view of a straddle-type vehicle according to a first embodiment of the present disclosure.

FIG. 1 is a side view of a straddle-type vehicle 1 according to a first embodiment. As shown in FIG. 1, in the present embodiment, the straddle-type vehicle 1 is a motorcycle. It should be noted that the straddle-type vehicle 1 is not limited to the motorcycle and may be any vehicle as long as it is a vehicle on which a rider rides across a seat, and may be, for example, a motor tricycle. The straddle-type vehicle 1 includes a front wheel 2, a rear wheel 3, and a vehicle body frame 4. The vehicle body frame 4 is supported by the front wheel 2 and the rear wheel 3. The vehicle body frame 4 includes a head pipe **4*a*, an engine mounting frame 4*b* connected to the head pipe 4*a* and disposed behind the head pipe 4*a*, and a seat support frame 4*c* connected to the engine mounting frame 4*b* and disposed behind the engine mounting frame 4*b***.

Specifically, the engine mounting frame **4*b* includes a main frame portion 4*d* extending rearward from the head pipe 4*a*, a down frame portion 4*e* extending downward from the head pipe 4*a*, a lower frame portion 4*f* extending rearward from a lower end portion of the down frame portion 4*e*, and a pivot frame portion 4*g* connecting a rear end portion of the main frame portion 4*d* to a rear end portion of the lower frame portion 4*f*. The straddle-type vehicle 1 includes a front fork 5 connecting the front wheel 2 to the vehicle body frame 4 and provided between the front wheel 2 and the vehicle body frame 4. The front fork 5 is provided at a lower portion of a steering shaft 7, and is connected to a bracket 8. The front fork 5** extends obliquely upward and rearward.

The front fork 5 is provided with a front suspension 6, and the front fork 5 is configured to extend and contract in a longitudinal direction by elastic deformation of a spring inside the front suspension 6. The front fork 5 extends and contracts in the longitudinal direction to reduce an impact transmitted to the vehicle body frame 4. The steering shaft 7 connected to the bracket 8 is supported by the head pipe 4*a*, which is a part of the vehicle body frame 4, in a manner of being angularly displaceable. The straddle-type vehicle 1 further includes a rear suspension 9 connecting the rear wheel 3 to a rear portion of the vehicle body frame 4. The rear suspension 9 is configured to be capable of absorbing an impact input to the rear wheel 3 via a swing arm 10. The swing arm 10 that supports the rear wheel 3 and extends in the front-rear direction are supported on the vehicle body frame 4 in a manner of being angularly displaceable.

The steering shaft 7 is provided with a handle 11 which the rider grips with his or her hands. A fuel tank 22 is provided on a rear side of the handle 11. A seat 13 on which the rider sits is provided on a rear side of the fuel tank 22. The straddle-type vehicle 1 includes an internal combustion engine E as a drive source that generates power to be transmitted to the wheels. The internal combustion engine E is supported by the engine mounting frame 4*b* between the front wheel 2 and the rear wheel 3. Specifically, the internal combustion engine E is disposed below the main frame portion 4*d*, behind the down frame portion 4*e*, above the lower frame portion 4*f*, and in front of the pivot frame portion 4*g*. In the present embodiment, the internal combustion engine E functions as a prime mover that generates a rotational drive force to be transmitted to the rear wheel 3.

The internal combustion engine E includes a cylinder Ea and a crankcase Eb disposed on a lower side of the cylinder Ea. The crankcase Eb houses a transmission 14 that varies the power output from the internal combustion engine E. The transmission 14 includes an input shaft 14*a*, an output shaft 14*b*, and a plurality of sets of gear trains (not shown) having different reduction ratios. The transmission 14 is configured to be capable of transmitting the power from the input shaft 14*a* to the output shaft 14*b* via the gear trains, and varies speed by selecting any set of the gear trains. The power output from the internal combustion engine E via the transmission 14 is transmitted to the rear wheel 3 via an output transmission structure 15 such as a chain or a belt. It should be noted that the drive force output from the internal combustion engine E is not necessarily transmitted to the rear wheel 3 by a chain, and may be transmitted by other power transmission members such as a belt.

The swing arm 10 extends in the front-rear direction of the vehicle and extends rearward from a pivot shaft 12 connected to a rear portion of the engine mounting frame 4*b*. Specifically, a front end portion of the swing arm 10 is pivotally supported by the pivot shaft 12 supported by the pivot frame portion 4*g*. The pivot shaft 12 is disposed behind the internal combustion engine E. The swing arm 10 swings in the upper-lower direction around the portion pivotally supported by the pivot shaft 12. The rear wheel 3 is pivotally supported by a rear end portion of the swing arm 10 and is connected to the swing arm 10. The pivot shaft 12 is disposed at a position higher than a lower portion of the engine mounting frame 4*b*. Specifically, the pivot shaft 12 is disposed at a position higher than a lower end of the lower frame portion 4*f*. More specifically, the pivot shaft 12 is disposed at a position higher than a lower end of the crankcase Eb.

The internal combustion engine E includes an intake port 16 and an exhaust port 17. The internal combustion engine E receives intake air from the intake port 16 and discharges an exhaust gas from the exhaust port 17 at the time of driving. For example, a case where the internal combustion engine E includes one cylinder will be described. Since the internal combustion engine E includes one cylinder, the internal combustion engine E includes one intake port and one exhaust port corresponding to one cylinder. It should be noted that, in a case where the internal combustion engine E includes a plurality of cylinders, the internal combustion engine E may include an intake port and an exhaust port for each cylinder. For example, in a case where the internal combustion engine E includes four cylinders, the internal combustion engine E may include four intake ports and four exhaust ports. The number of the cylinders of the internal combustion engine E may be five or more, and may be two or three. In this case, the internal combustion engine E may include intake ports and exhaust ports whose numbers correspond to the number of the cylinders.

The straddle-type vehicle 1 includes an exhaust assembly 18. The exhaust assembly 18 includes an exhaust pipe 20, a muffler 21, and a catalyst 23. The exhaust pipe 20 extends downward from the exhaust port 17 of the internal combustion engine E, changes a direction thereof rearward in the front-rear direction below the internal combustion engine E, and then extends rearward therefrom. The exhaust pipe 20 guides the exhaust gas discharged from the exhaust port 17 of the internal combustion engine E rearward. In the present embodiment, the exhaust pipe 20 is configured by one pipe, but in the case where the internal combustion engine E includes a plurality of cylinders, as the exhaust pipe 20, an exhaust manifold may be used that has a branch portion and is configured by pipes whose number corresponds to the number of the cylinders of the internal combustion engine E.

A side cover 29 is disposed on an outer side of the exhaust pipe 20 in the left-right direction so as to cover the outer side of the exhaust pipe 20 in the left-right direction at a part of the exhaust pipe 20 in the front-rear direction. The muffler 21 is connected to a downstream end portion 20*b* of the exhaust pipe 20. That is, the muffler 21 muffles exhaust noise of the exhaust gas flowing into the muffler 21 from the internal combustion engine E through the exhaust pipe 20. An exhaust opening 21*d* is provided in a downstream end portion 21*b* of the muffler 21. The exhaust gas passing through the muffler 21 is discharged from the exhaust opening 21*d* to the atmosphere.

Figure 2:
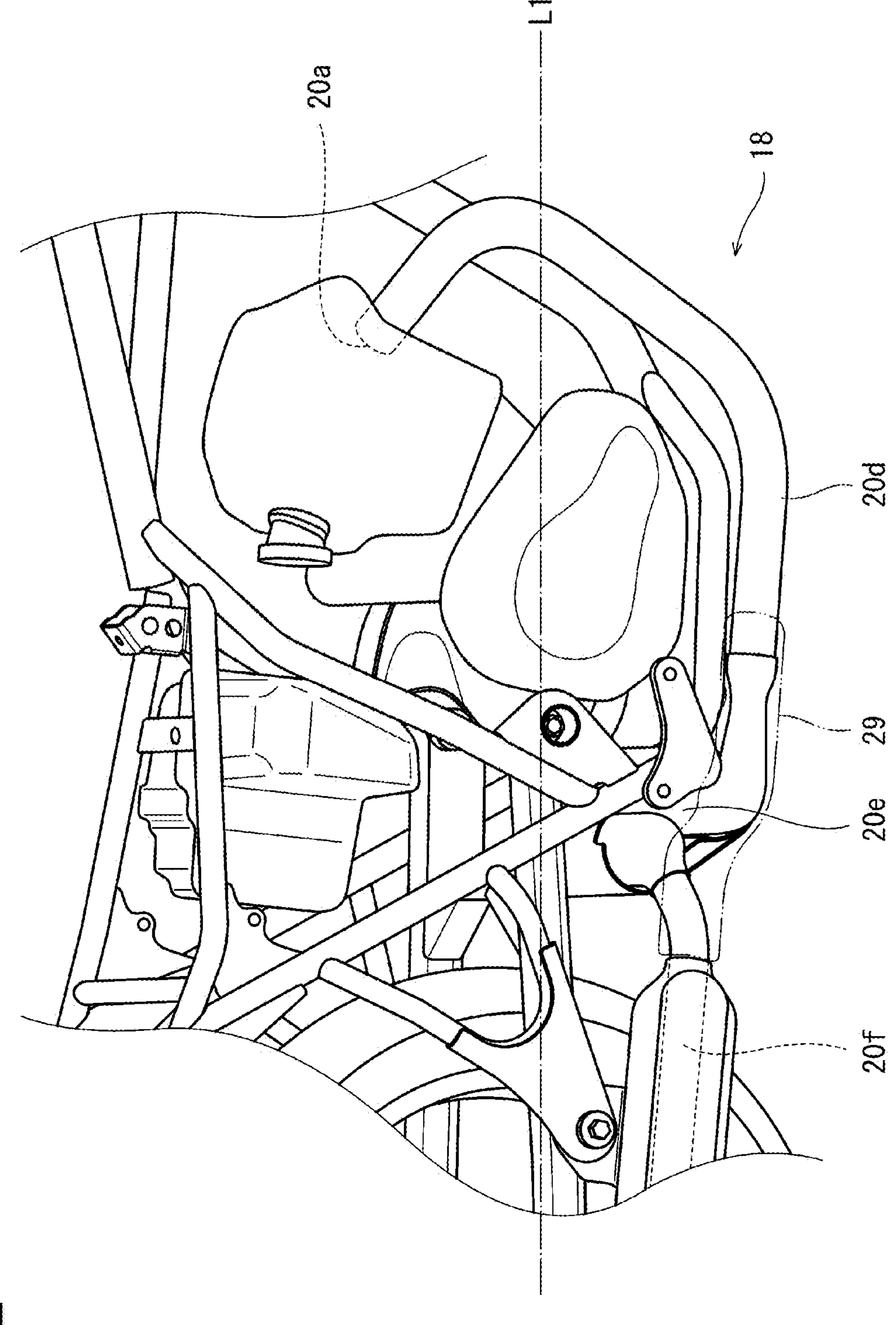
FIG. 2 is a perspective view of the periphery of an exhaust pipe in the straddle-type vehicle of FIG. 1 as viewed obliquely from above.

FIG. 2 is an enlarged perspective view of the periphery of the exhaust pipe 20 as viewed obliquely from above. In FIG. 2, the side cover 29 is indicated by a two-dot chain line so that the side cover 29 to be described later is seen through. Further, FIG. 3 is an enlarged perspective view of the periphery of the exhaust pipe 20 as viewed obliquely from below.

Figure 3:
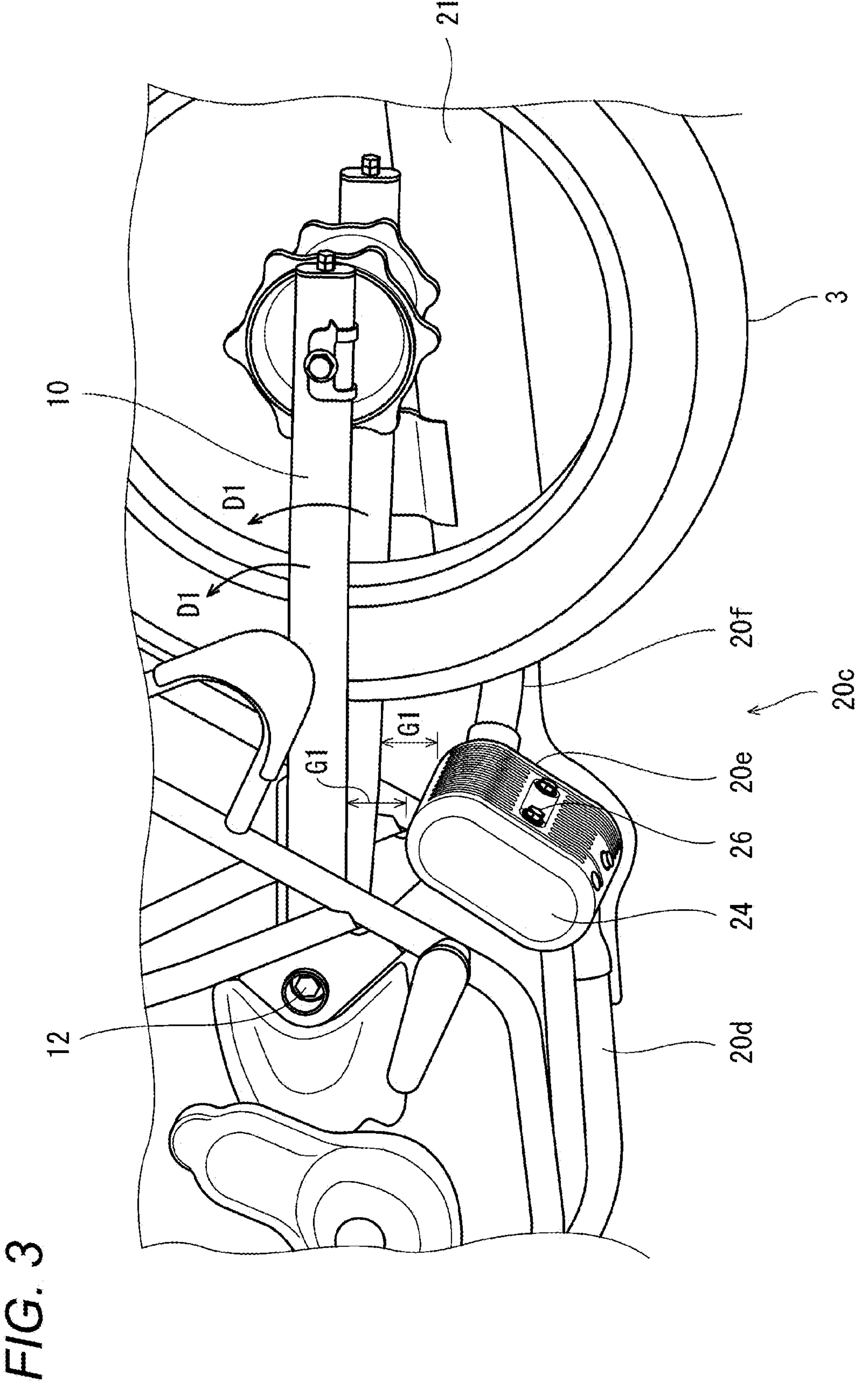
FIG. 3 is a perspective view of the periphery of the exhaust pipe in the straddle-type vehicle of FIG. 1 as viewed obliquely from below.

As shown in FIGS. 2 and 3, the exhaust pipe 20 includes an upstream portion 20*d*, an intermediate portion 20*e*, and a downstream portion 20*f*. The upstream portion 20*d* of the exhaust pipe 20 extends in the front-rear direction of the straddle-type vehicle 1 on an upstream side of the intermediate portion 20*e*, and connects the exhaust port 17 of the internal combustion engine E to the intermediate portion 20*e*. The upstream portion 20*d* of the exhaust pipe 20 passes below the internal combustion engine E. The downstream portion 20*f* of the exhaust pipe 20 extends in the front-rear direction of the straddle-type vehicle 1 on a downstream side of the intermediate portion 20*e*, and connects the intermediate portion 20*e* to the muffler 21. A downstream end of the upstream portion 20*d* and an upstream end of the downstream portion 20*f* are disposed outside the vehicle body frame 4 in the left-right direction of the vehicle.

The intermediate portion 20*e* is disposed at a position closer to a center line L1, which extends in the front-rear direction through the center of the straddle-type vehicle 1 in the left-right direction, than at least one of the upstream portion 20*d* and the downstream portion 20*f* in the left-right direction of the straddle-type vehicle 1. The intermediate portion 20*e* is disposed at a position closer to the center in the left-right direction than both the upstream portion 20*d* and the downstream portion 20*f* in the left-right direction of the straddle-type vehicle 1. The intermediate portion 20*e* protrudes from the upstream portion 20*d* and the downstream portion 20*f* toward an inner side of the straddle-type vehicle 1 in the left-right direction.

At the upstream portion 20*d*, the exhaust pipe 20 extends downward from a position connected to the exhaust port 17 of the internal combustion engine E, and then extends rearward in the front-rear direction. The exhaust pipe 20 is bent to extend from the upstream portion 20*d* toward the center of the straddle-type vehicle 1 in the left-right direction at the intermediate portion 20*e*. The intermediate portion 20*e* of the exhaust pipe 20 extends from the upstream portion 20*d* toward the center of the straddle-type vehicle 1 in the left-right direction, is bent outward in the reverse direction, and extends outward in the left-right direction of the straddle-type vehicle 1 and is connected to the downstream portion 20*f*. That is, the intermediate portion 20*e* of the exhaust pipe 20 has a U-shape.

The catalyst 23 is housed inside the intermediate portion 20*e* of the exhaust pipe 20. The catalyst 23 is disposed in front of the rear wheel 3, behind the internal combustion engine E, and below the swing arm 10. In particular, in the present embodiment, the catalyst 23 is disposed behind the engine mounting frame 4*b*.

The swing arm 10 is in a state where the position shown in FIG. 3 is a lower limit position in the upper-lower direction. The swing arm 10 is configured to be capable of rotating and moving upward as indicated by an arrow D1 around the pivot shaft 12 from the state of the lower limit position shown in FIG. 3. In the state where the swing arm 10 is at the lower limit position shown in FIG. 3, a gap G1 is secured in the upper-lower direction between the swing arm 10 and the intermediate portion 20*e*. Accordingly, even when the swing arm 10 rotates and moves around the pivot shaft 12, the gap is secured between the swing arm 10 and the intermediate portion 20*e*, and the swing arm 10 and the intermediate portion 20*e* do not interfere with each other.

Figure 4:
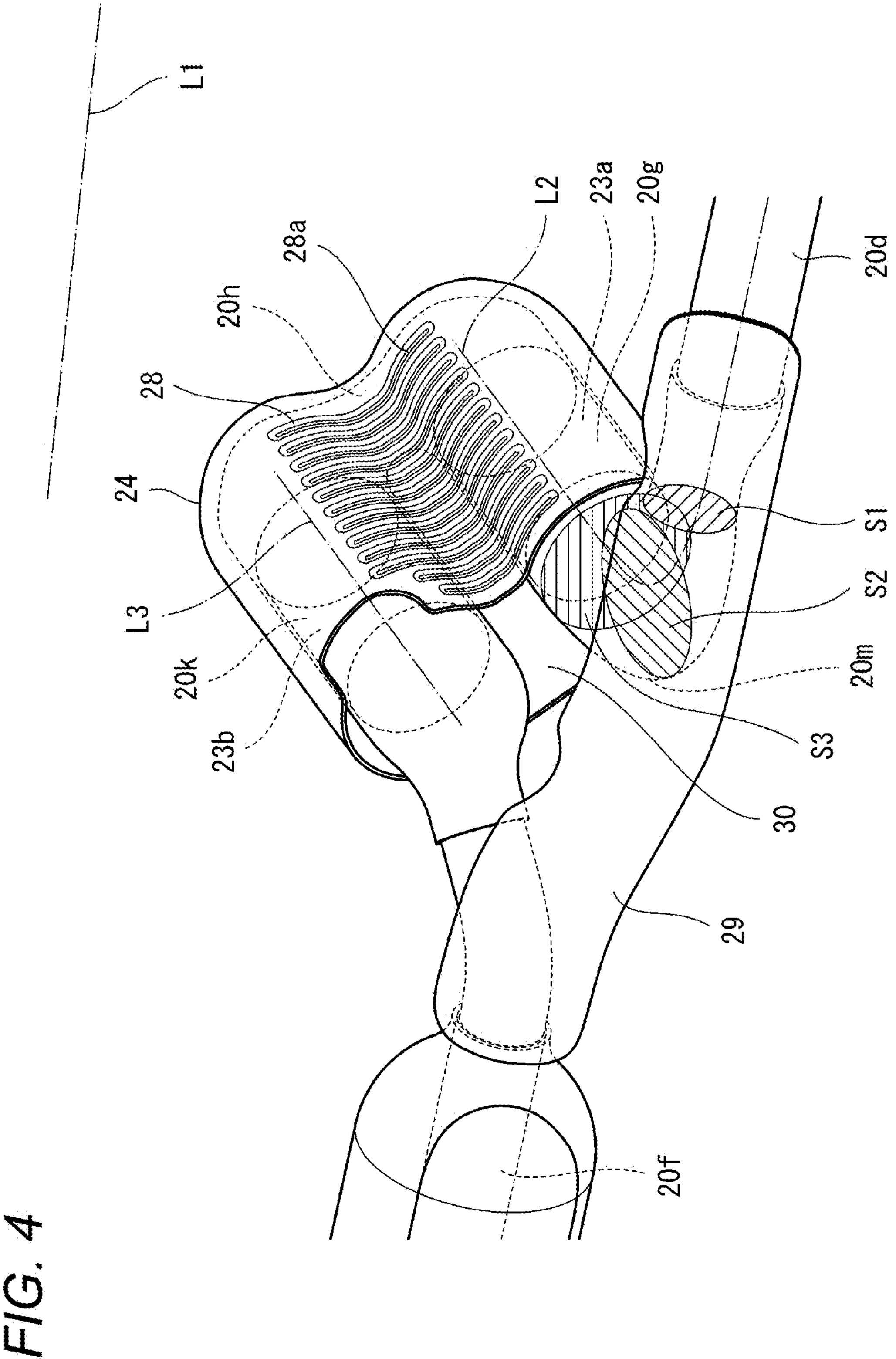
FIG. 4 is a perspective view of the periphery of an intermediate portion of the exhaust pipe in the straddle-type vehicle of FIG. 1 as viewed obliquely from above.
Figure 5:
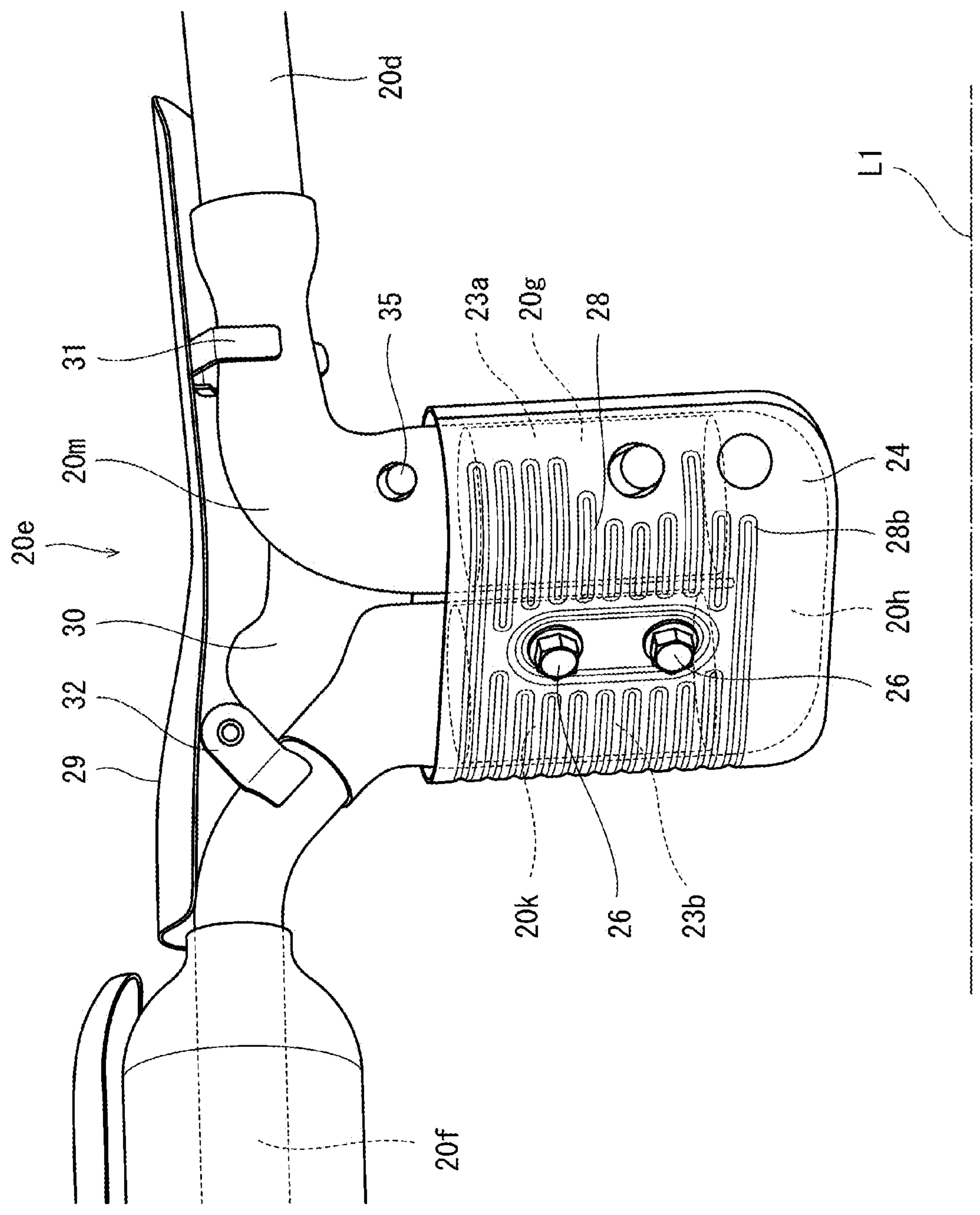
FIG. 5 is a perspective view of the periphery of the intermediate portion of the exhaust pipe in the straddle-type vehicle of FIG. 1 as viewed from below.

FIG. 4 is an enlarged perspective view of the intermediate portion 20*e* of the exhaust pipe 20 as viewed obliquely from above. FIG. 5 is an enlarged perspective view of the intermediate portion 20*e* of the exhaust pipe 20 as viewed obliquely from below. In the intermediate portion 20*e* of the exhaust pipe 20, the catalyst 23 is filled in portions in which flow passage axis lines L2 and L3 to be described later extend along the left-right direction of the straddle-type vehicle 1.

As described above, the upstream portion 20*d* and the downstream portion 20*f* of the exhaust pipe 20 are disposed on one side in the left-right direction with respect to the vehicle body frame 4. In the present embodiment, the upstream portion 20*d* and the downstream portion 20*f* of the exhaust pipe 20 are disposed at positions on a right side with respect to the rear wheel 3 in the left-right direction of the straddle-type vehicle 1. The intermediate portion 20*e* of the exhaust pipe 20 includes a first portion 20*g* connected to the upstream portion 20*d* and extending from the upstream portion 20*d* toward the other side (the left side) in the left-right direction, a second portion 20*h* curved rearward and upward from the first portion 20*g*, and a third portion 20*k* extending from the second portion 20*h* toward one side (the right side) in the left-right direction and connected to the downstream portion 20*f*. Each of the first portion 20*g* and the third portion 20*k* has a portion at which a flow passage axis line linearly extends along the left-right direction of the vehicle. As shown in FIG. 4, the flow passage axis line of the linearly extending portion of the first portion 20*g* is set to L2, and the flow passage axis line of the linearly extending portion of the third portion 20*k* is set to L3. The catalyst 23 housed in the first portion 20*g* of the intermediate portion 20*e* is referred to as a first catalyst 23*a*, and the catalyst 23 housed in the third portion 20*k* of the intermediate portion 20*e* is referred to as a second catalyst 23*b*. In a region in which the catalyst 23 in the intermediate portion 20*e* is disposed, the exhaust pipe 20 has a straight shape such that a flow passage cross-sectional area is constant.

The first portion 20*g* and the third portion 20*k* of the intermediate portion 20*e* of the exhaust pipe 20 are disposed at different heights. That is, the third portion 20*k* of the intermediate portion 20*e* is disposed at a position higher than the first portion 20*g*. Specifically, the third portion 20*k* is disposed behind and above the first portion 20*g* in the intermediate portion 20*e* of the exhaust pipe 20.

As shown in FIG. 5, the straddle-type vehicle 1 further includes an oxygen sensor 35 that is disposed at a position on an upstream side of the catalyst 23. In the present embodiment, the oxygen sensor 35 is attached to the intermediate portion 20*e* of the exhaust pipe 20. The oxygen sensor 35 is inserted and attached from a lower surface of the exhaust pipe 20 toward a flow passage of the exhaust pipe 20.

Figure 6:
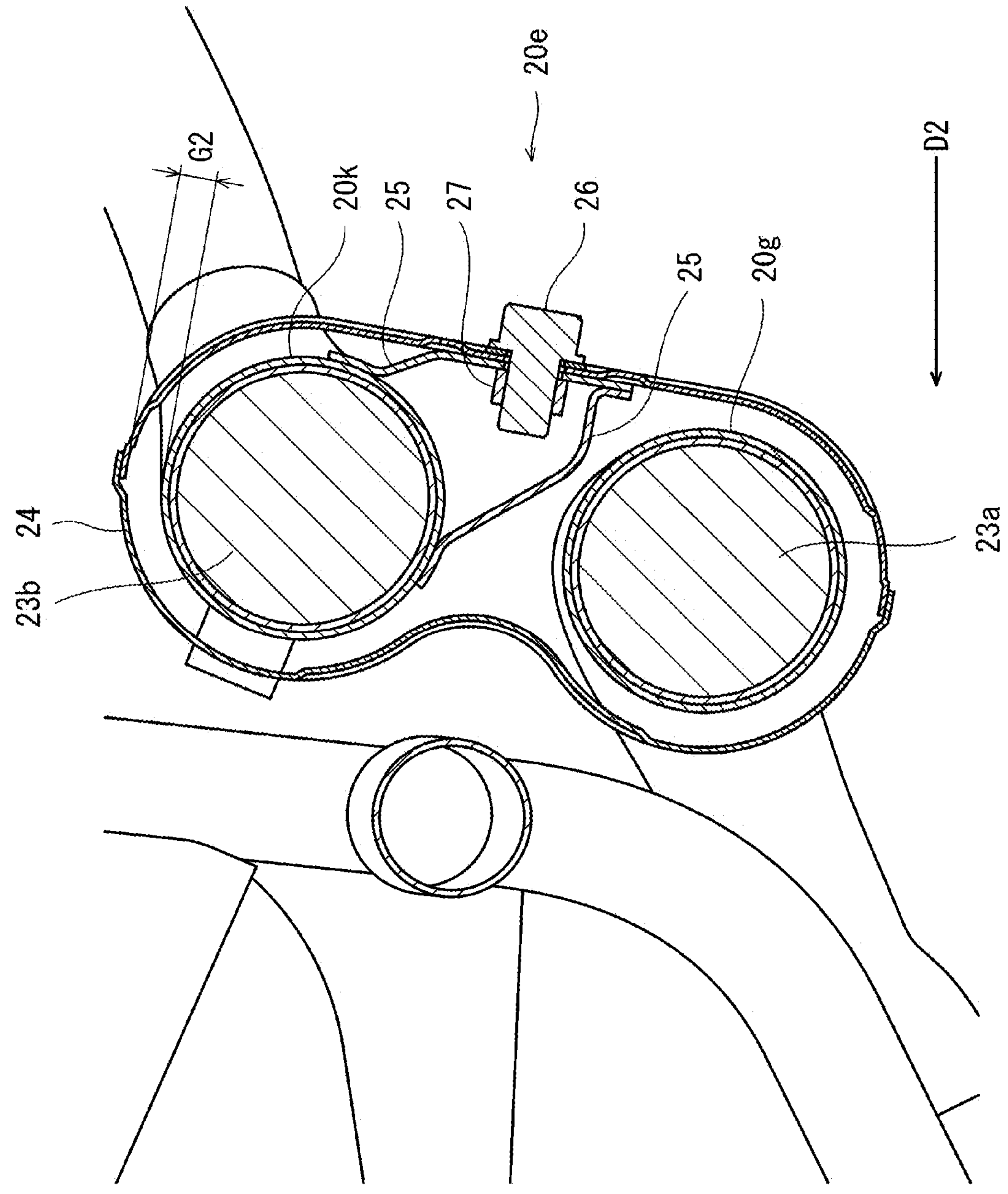
FIG. 6 is a cross-sectional view of the intermediate portion of the exhaust pipe in the straddle-type vehicle in FIG. 1 as viewed in a left-right direction of the vehicle.

FIG. 6 is a cross-sectional view of the first portion 20*g* and the third portion 20*k* of the intermediate portion 20*e* of the exhaust pipe 20 along a plane orthogonal to an extending direction of the exhaust pipe 20. As shown in FIGS. 3 to 6, the straddle-type vehicle 1 includes a heat shielding cover 24 that covers the intermediate portion 20*e* of the exhaust pipe 20. The heat shielding cover 24 is disposed at a gap G2 to the intermediate portion 20*e* of the exhaust pipe 20. In the present embodiment, the heat shielding cover 24 is disposed at the gap G2 to the intermediate portion 20*e* over the entire intermediate portion 20*e*. In the present embodiment, a bracket 25 is attached between the intermediate portion 20*e* of the exhaust pipe 20 and the heat shielding cover 24 to be connected to both the intermediate portion 20*e* and the heat shielding cover 24, and the heat shielding cover 24 is supported by the intermediate portion 20*e* while maintaining the gap G2 between the intermediate portion 20*e* and the heat shielding cover 24. As shown in FIG. 6, the bracket 25 is connected to the heat shielding cover 24 by fastening a bolt 26 and a nut 27. In the present embodiment, the bolt 26 is inserted into the heat shielding cover 24 toward a direction D2 from the rear side to the front side at a rear position on the heat shielding cover 24 in the front-rear direction, and is fastened to the nut 27 inside the heat shielding cover 24. The bracket 25 is connected to the third portion 20*k* of the intermediate portion 20*e* of the exhaust pipe 20 from below by welding, adhesion, or the like.

The heat shielding cover 24 has a plurality of recesses 28 formed on surfaces thereof. The heat shielding cover 24 has recesses 28*a* formed on a surface facing upward and recesses 28*b* formed on a surface facing downward. The plurality of recesses 28 are, for example, a plurality of grooves extending in the front-rear direction of the vehicle.

The bolt 26 is provided on a lower side of the heat shielding cover 24, and thus the recesses 28*b* are formed to avoid a position in which the bolt 26 is disposed. The recesses 28*a* are formed on an upper side of the heat shielding cover 24 at positions close to the center in the front-rear direction. Since the recesses 28*a* and the recesses 28*b* are formed on the heat shielding cover 24, a surface area (a heat dissipation area) of a portion of the heat shielding cover 24 facing the outside can be increased. Accordingly, even when heat from the exhaust gas is transmitted to the heat shielding cover 24 via the exhaust pipe 20 and the heat shielding cover 24 becomes high in temperature, the heat of the heat shielding cover 24 can be suitably dissipated to the outside. Accordingly, excessive accumulation of the heat inside the heat shielding cover 24 can be restrained.

A connection structure between the heat shielding cover 24 and the exhaust pipe 20 is not limited to the above-described embodiment, other configurations may be adopted for the connection between the heat shielding cover and the exhaust pipe as long as the heat shielding cover is connected to the exhaust pipe in a state where the gap is secured between the heat shielding cover and the exhaust pipe.

The intermediate portion 20*e* of the exhaust pipe 20 is not directly connected to any one of other components such as the vehicle body frame 4. Accordingly, the intermediate portion 20*e* is not supported by the vehicle body frame 4 or other components. In the exhaust assembly 18, an upstream end portion 20*a* of the exhaust pipe 20 is connected to the internal combustion engine E and is supported by the internal combustion engine E, and the muffler 21 is supported by the vehicle body frame 4. Since the exhaust pipe 20 is not supported around the intermediate portion 20*e*, when vibration occurs in the exhaust pipe 20 including the intermediate portion 20*e*, a stress of the exhaust pipe 20 due to the vibration can be released. Accordingly, a load acting on the exhaust pipe 20 can be reduced.

As shown in FIGS. 4 and 5, in the present embodiment, the straddle-type vehicle 1 includes the side cover 29 that covers the upstream portion 20*d* and the downstream portion 20*f* from one side in the left-right direction across the upstream portion 20*d* and the downstream portion 20*f*. The side cover 29 covers a void 30 between the first portion 20*g* and the third portion 20*k* of the intermediate portion 20*e* from one side in the left-right direction. The side cover 29 covers the void 30 between the first portion 20*g* and the third portion 20*k* of the intermediate portion 20*e* from the right side of the straddle-type vehicle 1.

Since the side cover 29 extends across the upstream portion 20*d* and the downstream portion 20*f*, it is possible to give a visual impression that the upstream portion 20*d* and the downstream portion 20*f* of the exhaust pipe are continuous to a person who views the straddle-type vehicle 1 from a side, and it is possible to improve the design of the straddle-type vehicle 1.

As shown in FIG. 5, the side cover 29 is detachably attached to the exhaust pipe 20. For example, a clamp 31 fixed to a front portion of an inner surface of the side cover 29 is locked to the upstream portion 20*d* of the exhaust pipe 20, and a clamp 32 fixed to a rear portion of the inner surface of the side cover 29 is locked to the downstream portion 20*f* of the exhaust pipe 20.

The catalyst 23 comes into contact with the exhaust gas flowing inside the exhaust pipe 20 and purifies the exhaust gas. In order to efficiently use the catalyst 23, it is preferable that the flow of the exhaust gas is a uniform flow without a deviation of a flow velocity in a cross section of the exhaust pipe 20. When there is a local deviation in the flow velocity of the exhaust gas in the cross section of the exhaust pipe, a case is conceivable that a processing capacity of the catalyst for purifying the exhaust gas exceeds a limit at a portion in which a large amount of exhaust gas flows, and a purification process for all the exhaust gas cannot be sufficiently performed at the portion. In addition, a case is conceivable that at a portion in which a flow rate of the exhaust gas is small, the catalyst performs the purification process only on the exhaust gas whose amount is small with respect to the processing capacity of the catalyst for the purification process, and thus insufficient use of the catalyst is caused.

As shown in FIG. 4, in the present embodiment, in order to cause the exhaust gas flowing toward the catalyst 23 to be a uniform flow without the deviation in a radial direction, in a corner portion 20*m* of the exhaust pipe 20, the flow passage cross-sectional area is configured to increase toward the downstream side at least at a portion of the corner portion 20*m* along a flow passage axis line.

The flow passage cross-sectional area of the curved corner portion 20*m* connecting the upstream portion 20*d* to the intermediate portion 20*e* of the exhaust pipe 20 increases toward the downstream side at least at the portion of the corner portion 20*m* along the flow passage axis line. In the present embodiment, the flow passage cross-sectional area of the corner portion 20*m* increases toward the downstream side at the entire corner portion 20*m* along the flow passage axis line. The corner portion 20*m* of the exhaust pipe 20 is configured such that a rate of increase in the flow passage cross-sectional area is the largest at a position in which the flow passage axis line of the corner portion 20*m* is bent by 45 degrees with respect to a flow passage axis line of the upstream portion 20*d*. When the position in which the flow passage axis line of the corner portion 20*m* is bent by 45 degrees with respect to the flow passage axis line of the upstream portion 20*d* is exceeded, the rate of increase in the flow passage cross-sectional area gradually decreases.

In the present embodiment, the curved corner portion 20*m* connecting the upstream portion 20*d* to the intermediate portion 20*e* is bent by 90 degrees, the flow passage cross-sectional area increases at the corner portion 20*m*, and the rate of increase in the flow passage cross-sectional area is the largest at a position in which the exhaust pipe 20 is bent at 45 degrees, which is half the angle of the bend of the corner portion 20*m*. However, the angle of the bend of the corner portion 20*m* is not limited to 90 degrees. The angle of the bend of the corner portion 20*m* may be an angle other than 90 degrees. In this case, the flow passage cross-sectional area of the corner portion 20*m* may gradually increase toward the downstream side, and the rate of increase in the flow passage cross-sectional area may be the largest at an intermediate position of the corner portion 20*m*. For example, in a case where the corner portion 20*m* is bent by 120 degrees, the flow passage cross-sectional area of the corner portion 20*m* may gradually increase toward the downstream side, and the rate of increase in the flow passage cross-sectional area may be the largest at a position in which the exhaust pipe 20 is bent by 60 degrees.

FIG. 4 shows a flow passage cross section S1 of the exhaust pipe 20 at a position in which the exhaust pipe 20 is bent by 0 degrees with respect to the flow passage axis line of the upstream portion 20*d*, a flow passage cross section S2 of the exhaust pipe 20 at a position in which the exhaust pipe 20 is bent by 45 degrees with respect to the flow passage axis line of the upstream portion 20*d*, and a flow passage cross section S3 of the exhaust pipe 20 at a position in which the exhaust pipe 20 is bent by 90 degrees with respect to the flow passage axis line of the upstream portion 20*d*. When the flow passage cross section S1, the flow passage cross section S2, and the flow passage cross section S3 are compared, a cross-sectional area of the flow passage cross section of the corner portion 20*m* gradually increases toward the downstream side, and thus the cross-sectional area of the flow passage cross section S2 is larger than the cross-sectional area of the flow passage cross section S1, and the cross-sectional area of the flow passage cross section S3 is larger than the cross-sectional area of the flow passage cross section S2. Further, when the flow passage cross section S2 is exceeded, the cross-sectional area increases toward the downstream side, but a rate of increase in the cross-sectional area decreases toward the downstream side. By forming the shape of the corner portion 20*m* in this manner, a centrifugal force acting on the exhaust gas when the exhaust gas passes through the corner portion 20*m* can be reduced. Accordingly, when the exhaust gas passes through a straight pipe portion after passing through the corner portion 20*m*, the exhaust gas can flow into the exhaust pipe 20 while restraining the flow of the exhaust gas from being deviated in the flow passage cross section.

Figure 7:
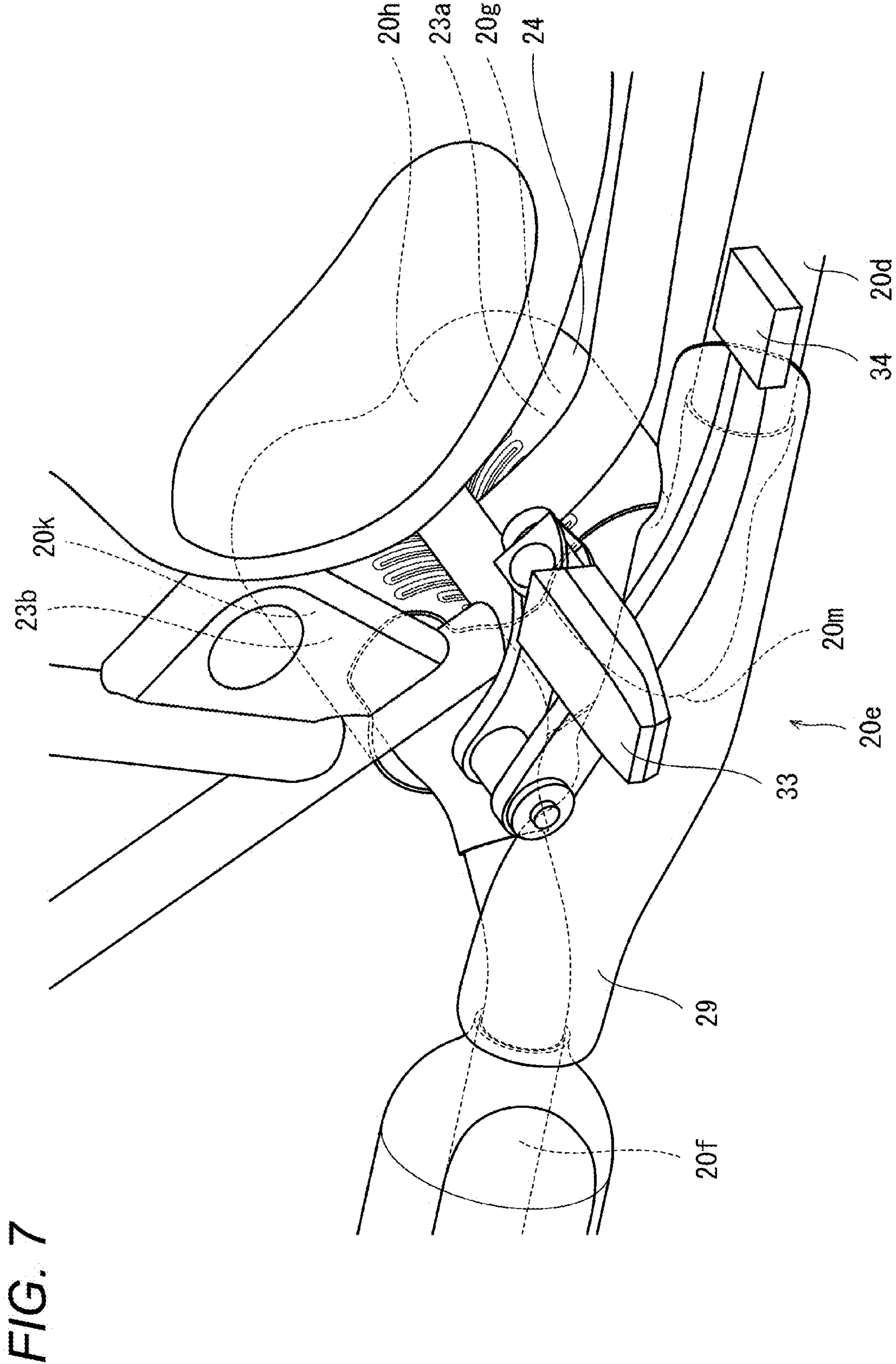
FIG. 7 is a perspective view of the periphery of the intermediate portion of the exhaust pipe in the straddle-type vehicle of FIG. 1 as viewed obliquely from above in a state where a step and a foot brake are attached.

FIG. 7 is a perspective view showing the periphery of the intermediate portion 20*e* of the exhaust pipe 20 in a state where a step 33 and a foot brake 34 are attached. In the present embodiment, the straddle-type vehicle 1 further includes the step 33 on which a foot of the rider is placed, and the foot brake 34 that is operated by the rider with the foot. As shown in FIG. 7, in the present embodiment, the foot brake 34 is disposed outside the side cover 29 in the left-right direction, and is disposed on one side (the right side) in the left-right direction with respect to the side cover 29. In addition, the step 33 is disposed outside the foot brake 34 in the left-right direction, and is disposed on one side (the right side) in the left-right direction with respect to the foot brake 34. Accordingly, the step 33 is disposed on one side (the right side) in the left-right direction with respect to the side cover 29. The step 33 is disposed vertically above the side cover 29 in a side view of the vehicle.

According to the configuration described above, the catalyst 23 is disposed in a space that is disposed in front of the rear wheel 3, behind the internal combustion engine E, and below the swing arm 10, and thus even when the catalyst 23 large in size is used, the catalyst 23 can be mounted in the straddle-type vehicle 1 while restraining the exhaust pipe 20 housing the catalyst 23 from interfering with other components. Accordingly, a degree of freedom in layout relating to the catalyst 23 can be improved.

In addition, the intermediate portion 20*e* of the exhaust pipe 20 is disposed on a center side in the left-right direction of the vehicle with respect to the upstream portion 20*d* and the downstream portion 20*f*, and thus the portion of the exhaust pipe 20 in which the catalyst 23 is housed is less likely to be visually recognized from the outside of the vehicle. Accordingly, the appearance of the straddle-type vehicle 1 can be improved. Further, when the straddle-type vehicle 1 is a leaning vehicle, it is possible to prevent the intermediate portion 20*e* of the exhaust pipe 20 from interfering with the ground when the vehicle is leant.

Further, the flow passage axis lines L2 and L3 of the portions, which are filled with the catalyst 23, of the intermediate portion 20*e* of the exhaust pipe 20 extend in the left-right direction of the straddle-type vehicle 1, and thus the space disposed in front of the rear wheel 3, behind the engine mounting frame 4*b*, and below the swing arm 10 can be fully used in the left-right direction of the straddle-type vehicle 1. Accordingly, layout efficiency of the straddle-type vehicle 1 can be improved.

In addition, the intermediate portion 20*e* of the exhaust pipe 20 has the U-shape, and thus it is possible to house the catalyst of a sufficient amount while setting the layout of the exhaust pipe 20 to a compact layout. Since the intermediate portion 20*e* of the exhaust pipe 20 has the U-shape, the straight-shaped portion can be lengthened even when the entire intermediate portion 20*e* is not lengthened in the left-right direction of the vehicle, and the volume of the portion in which the catalyst 23 can be disposed can be increased correspondingly.

In addition, the intermediate portion 20*e* of the exhaust pipe 20 has the U-shape, and the catalyst 23 is housed in the first portion 20*g* and the third portion 20*k* of the intermediate portion 20*e*, which extend in the left-right direction, and thus the catalyst of the sufficient amount can be housed in the intermediate portion 20*e* of the exhaust pipe 20, and a stable and uniform catalyst reaction can be promoted without housing the catalyst 23 in the curved portion of the exhaust pipe 20.

Further, since the first portion 20*g* and the third portion 20*k* of the intermediate portion 20*e* of the exhaust pipe 20 are disposed at different heights, the first portion 20*g* and the third portion 20*k* can be disposed close to each other in the front-rear direction of the vehicle, and a clearance between the intermediate portion 20*e* of the exhaust pipe 20 and the rear wheel 3 in the front-rear direction of the vehicle can be increased. Accordingly, the degree of freedom in layout of the straddle-type vehicle 1 can be further improved.

Of the first portion 20*g* on the upstream side and the third portion 20*k* on the downstream side of the intermediate portion 20*e* of the exhaust pipe 20, the third portion 20*k* on the downstream side is disposed higher than the first portion 20*g* on the upstream side, and thus the downstream side of the exhaust pipe 20 can be disposed high without causing an excessive layout of the exhaust pipe 20. Accordingly, the muffler 21 can be disposed high while the exhaust pipe 20 is laid out without waste.

In addition, the side cover 29 covers the void 30 between the first portion 20*g* and the third portion 20*k* of the intermediate portion 20*e* from one side (the right side) in the left-right direction of the straddle-type vehicle 1, and thus the side cover 29 can hide the void 30 between the first portion 20*g* and the third portion 20*k* of the intermediate portion 20*e* from the outside in the left-right direction of the vehicle. Accordingly, when the exhaust pipe 20 is viewed from the outside in the left-right direction of the vehicle, the upstream portion 20*d* and the downstream portion 20*f* can be viewed as being continuous with each other, and the vehicle appearance can be improved.

Further, since the step 33 is disposed on one side (the right side) in the left-right direction with respect to the side cover 29, when the rider places his or her foot on the step 33, the side cover 29 is located between the foot of the rider and the exhaust pipe 20. Accordingly, the side cover 29 serves as a heat guard and protects the rider's foot from the heat of the exhaust pipe 20.

In addition, the flow passage cross-sectional area of the corner portion 20*m* of the exhaust pipe 20 increases toward the downstream side at least at the portion of the corner portion 20*m* along the flow passage axis line, and thus the flow velocity of the exhaust gas that reaches the corner portion 20*m* from the upstream portion 20*d* is decelerated due to the increase in the flow passage cross-sectional area, and the centrifugal force on the exhaust gas passing through the corner portion 20*m* is weakened. Accordingly, it is possible to restrain the occurrence of the deviation in the flow velocity of the exhaust gas passing through the corner portion 20*m* inside the cross section of the corner portion 20*m*, and this makes it possible to restrain the exhaust gas flowing from the corner portion 20*m* to the intermediate portion 20*e* from partially passing through the catalyst 23 to cause deviation in the catalyst reaction.

In addition, since the heat shielding cover 24 covers the intermediate portion 20*e* and the heat shielding cover 24 is disposed at the gap G2 to the intermediate portion 20*e*, it is possible to restrain the heat of the catalyst 23 from being directly transmitted to the surrounding components due to heat transfer. Accordingly, local heat transfer from the catalyst 23 to the outside of the heat shielding cover 24 can be restrained. For example, even when an electronic component and the like, which are vulnerable to heat, are disposed above the position in which the catalyst 23 is disposed, the components can be protected from the heat by the heat shielding cover 24.

In addition, since the oxygen sensor 35 is attached to the intermediate portion 20*e* of the exhaust pipe 20, the oxygen sensor 35 is attached to a position on the exhaust pipe 20 close to the center of the straddle-type vehicle 1 in the left-right direction. Accordingly, when the straddle-type vehicle 1 is viewed in a side view, the oxygen sensor 35 is less likely to be visually recognized from the outside of the vehicle, and the vehicle appearance can be improved.

Although the configuration has been described in the above embodiment in which the flow passage cross-sectional area increases toward the downstream side at the corner portion 20*m* in which the upstream portion 20*d* is connected to the intermediate portion 20*e*, and the rate of increase in the flow passage cross-sectional area is the largest at the intermediate position in which the exhaust pipe 20 is bent by 45 degrees, the present disclosure is not limited to the above embodiment. A configuration may be adopted in which the flow passage cross-sectional area increases toward the downstream side not only at the corner portion 20*m* in which the upstream portion 20*d* is connected to the intermediate portion 20*e* but also at another corner portion, and the rate of increase in the flow passage cross-sectional area is the largest at an intermediate position of the corner portion. For example, a configuration may be adopted in which in the intermediate portion 20*e* of the exhaust pipe 20, the flow passage cross-sectional area also increases toward the downstream side at a corner portion through which the first catalyst 23*a* passes and that is directed from the second portion 20*h* toward the third portion 20*k*, and the rate of increase in the flow passage cross-sectional area is the largest at an intermediate position of the corner portion. With this configuration, the flow velocity of the exhaust gas flowing into the second catalyst 23*b* can be made uniform without the deviation inside the cross section of the exhaust pipe 20, the second catalyst 23*b* can be efficiently used inside the entire cross section of the exhaust pipe 20, and a purification capacity with respect to the exhaust gas can be improved. In addition, a configuration may be adopted in which the flow passage cross-sectional area increases toward the downstream side at another portion of the exhaust pipe 20, and the rate of increase in the flow passage cross-sectional area is the largest at the intermediate position of the corner portion.

Second Embodiment

Next, a straddle-type vehicle according to a second embodiment will be described. The description of parts common to the first embodiment will be omitted. The second embodiment is different from the first embodiment in that the exhaust assembly is provided on both the left side and the right side of the vehicle in the left-right direction, and the intermediate portion of the exhaust pipe is provided in each exhaust assembly.

Figure 8:
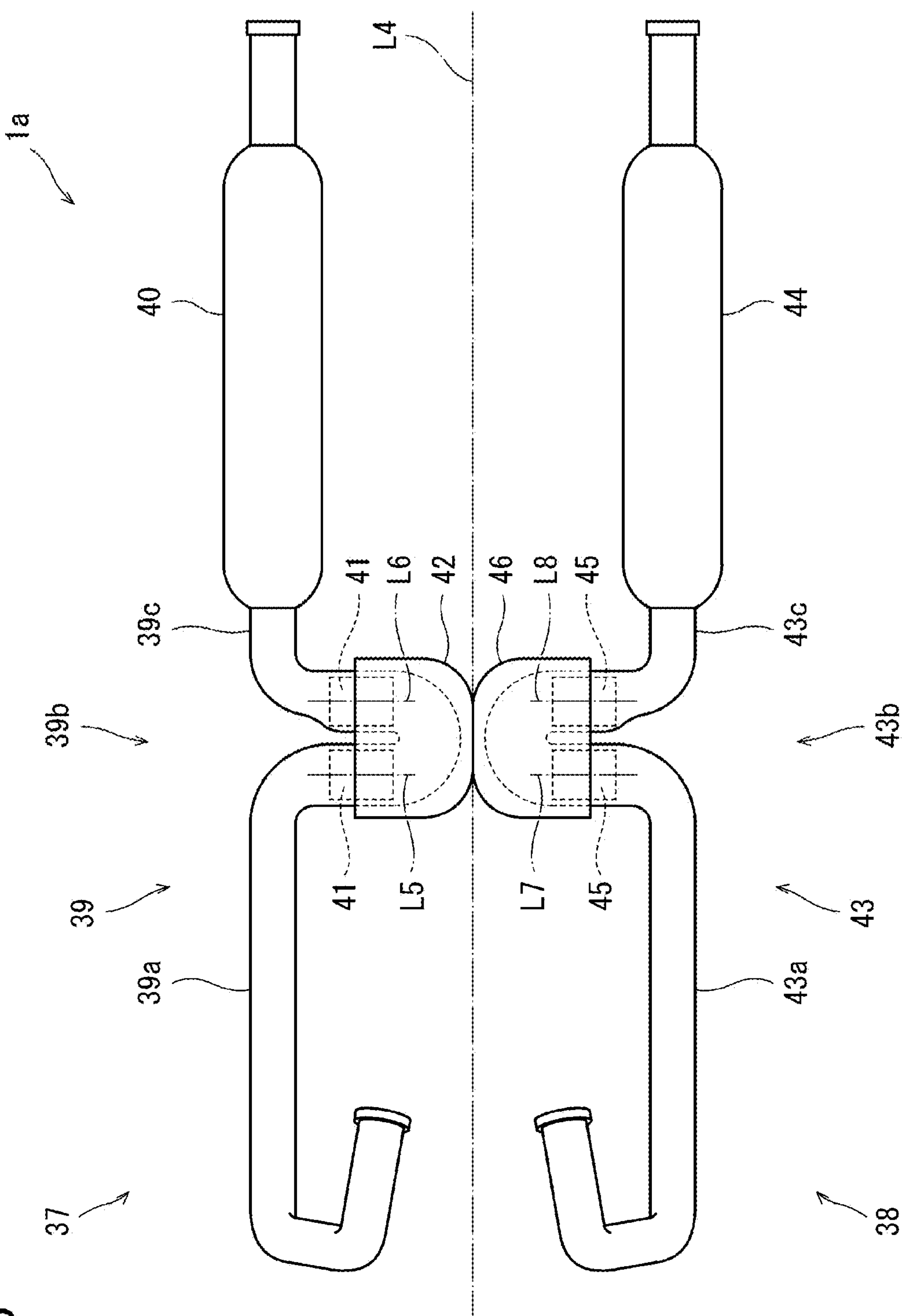
FIG. 8 is a plan view schematically showing only exhaust assemblies in a straddle-type vehicle according to a second embodiment of the present disclosure.

FIG. 8 is a plan view showing only the exhaust assemblies of a straddle-type vehicle 1*a* according to the second embodiment. In the second embodiment, for example, the internal combustion engine E includes two cylinders, and the internal combustion engine E accordingly includes two exhaust ports. Therefore, in the second embodiment, the straddle-type vehicle 1*a* includes a first exhaust assembly 37 and a second exhaust assembly 38 that correspond to the two exhaust ports of the internal combustion engine E and are respectively disposed on the left side and the right side of the straddle-type vehicle 1*a*.

The first exhaust assembly 37 is connected to the exhaust port of the internal combustion engine E and guides the exhaust gas discharged from the exhaust port of the internal combustion engine E rearward. The first exhaust assembly 37 includes an exhaust pipe 39, a muffler 40, and a catalyst 41. The exhaust pipe 39 is connected to the exhaust port of the internal combustion engine E and extends downward from the exhaust port, changes a direction thereof rearward in the front-rear direction below the internal combustion engine E, and then extends rearward therefrom.

The exhaust pipe 39 includes an upstream portion 39*a*, an intermediate portion 39*b*, and a downstream portion 39*c*. The upstream portion 39*a* of the exhaust pipe 39 extends in the front-rear direction of the straddle-type vehicle 1*a* on an upstream side of the intermediate portion 39*b*. The downstream portion 39*c* of the exhaust pipe 39 extends in the front-rear direction of the straddle-type vehicle 1*a* on a downstream side of the intermediate portion 39*b*. The upstream portion 39*a* and the downstream portion 39*c* are disposed at substantially the same position in the left-right direction of the straddle-type vehicle 1*a*. The intermediate portion 39*b* is disposed at a position on an upstream side of the muffler 40.

The intermediate portion 39*b* protrudes from the upstream portion 39*a* and the downstream portion 39*c* toward a center line L4 extending in the front-rear direction of the straddle-type vehicle 1*a* in the left-right direction of the straddle-type vehicle 1*a*. A shape of the intermediate portion 39*b* is substantially the same as that of the intermediate portion 20*e* according to the first embodiment, but the entire intermediate portion 39*b* is disposed on one side in the left-right direction with respect to the center line L4. That is, the intermediate portion 39*b* has a size in the left-right direction of the vehicle that is not sufficient to extend over the center line L4.

The catalyst 41 is housed inside the intermediate portion 39*b* of the exhaust pipe 39. In the intermediate portion 39*b* of the exhaust pipe 39, the catalyst 41 is filled in portions in which flow passage axis lines L5 and L6 extend along the left-right direction of the straddle-type vehicle 1*a*. The intermediate portion 39*b* of the exhaust pipe 39 is covered at a gap by a heat shielding cover 42.

The second exhaust assembly 38 has a shape that is bilaterally symmetrical to the first exhaust assembly 37. The second exhaust assembly 38 includes an exhaust pipe 43, a muffler 44, and a catalyst 45. The exhaust pipe 42 is connected to the exhaust port of the internal combustion engine E and extends downward from the exhaust port, changes a direction thereof rearward in the front-rear direction below the internal combustion engine E, and then extends rearward therefrom.

An intermediate portion 43*b* protrudes from an upstream portion 43*a* and a downstream portion 43*c* toward the center line L4 in the left-right direction of the straddle-type vehicle 1*a*. A shape of the intermediate portion 43*b* is substantially the same as that of the intermediate portion 20*e* according to the first embodiment, but the entire intermediate portion 43*b* is disposed on the other side in the left-right direction with respect to the center line L4. That is, the intermediate portion 43*b* has a size in the left-right direction of the vehicle that is not sufficient to extend over the center line L4.

The catalyst 45 is housed inside the intermediate portion 43*b* of the exhaust pipe 43. In the present embodiment, in the intermediate portion 43*b* of the exhaust pipe 43, the catalyst is filled in portions in which flow passage axis lines L7 and L8 extend along the left-right direction of the straddle-type vehicle 1*a*. The intermediate portion 43*b* of the exhaust pipe 43 is covered at a gap by a heat shielding cover 46.

In the present embodiment, the heat shielding cover 42 of the first exhaust assembly 37 and the heat shielding cover 46 of the second exhaust assembly 38 are in contact with each other at a position close to the center of the straddle-type vehicle 1*a* in the left-right direction, but the heat shielding cover 42 of the first exhaust assembly 37 and the heat shielding cover 46 of the second exhaust assembly 38 may not be in contact with each other. The intermediate portion 39*b* of the exhaust pipe 39 of the first exhaust assembly 37 and the intermediate portion 43*b* of the exhaust pipe 43 of the second exhaust assembly 38 face each other in the left-right direction of the straddle-type vehicle 1*a*.

According to the present embodiment, since the first exhaust assembly 37 and the second exhaust assembly 38 are disposed to be bilaterally symmetric, the intermediate portion 39*b* of the exhaust pipe 39 of the first exhaust assembly 37 and the intermediate portion 43*b* of the exhaust pipe 43 of the second exhaust assembly 38 can be disposed at the same position in the front-rear direction. Therefore, a space in the straddle-type vehicle 1*a* can be efficiently used, and a degree of freedom in layout relating to each of the catalysts 41 and 45 can be improved when the straddle-type vehicle 1*a* includes the pair of left and right exhaust assemblies.

Third Embodiment

Next, a straddle-type vehicle according to a third embodiment will be described. The description of parts common to the first embodiment and the second embodiment will be omitted. The third embodiment is different from the first embodiment and the second embodiment in that two exhaust assemblies are provided and the two exhaust assemblies are arranged such that exhaust pipes of the two exhaust assemblies intersect each other.

Figure 9:
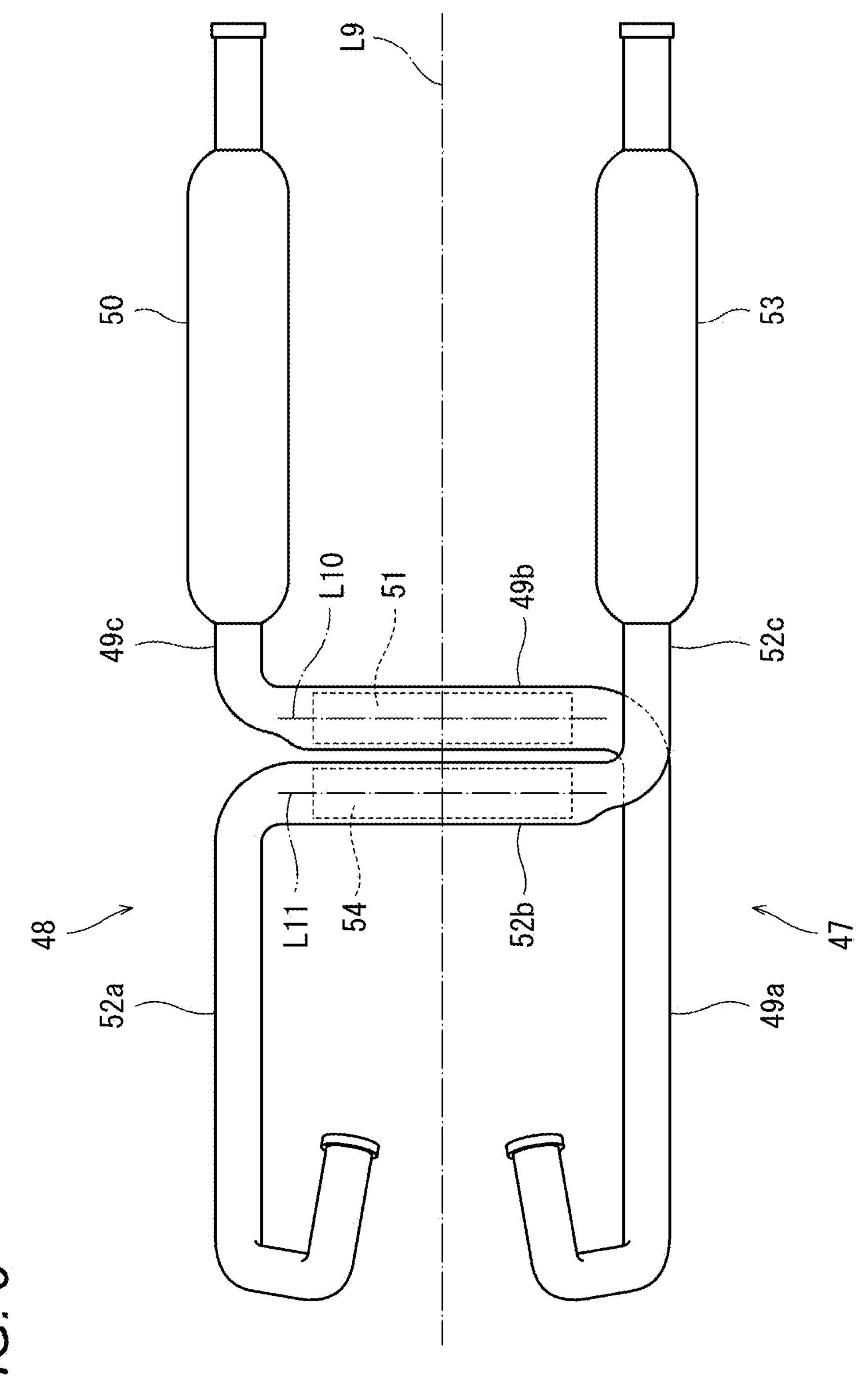
FIG. 9 is a plan view schematically showing only exhaust assemblies in a straddle-type vehicle according to a third embodiment of the present disclosure.

FIG. 9 is a plan view showing only the exhaust assemblies of a straddle-type vehicle 1*b* according to the third embodiment. Also in the third embodiment, the internal combustion engine E includes two exhaust ports as in the second embodiment. Therefore, also in the third embodiment, the straddle-type vehicle 1*b* includes a first exhaust assembly 47 and a second exhaust assembly 48 that correspond to the two exhaust ports of the internal combustion engine E.

The first exhaust assembly 47 is connected to the exhaust port of the internal combustion engine E and guides the exhaust gas discharged from the exhaust port of the internal combustion engine E rearward. The first exhaust assembly 47 includes an exhaust pipe 49, a muffler 50, and a catalyst 51. The exhaust pipe 49 is connected to the exhaust port of the internal combustion engine E and extends downward from the exhaust port, changes a direction thereof rearward in the front-rear direction below the internal combustion engine E, and then extends rearward therefrom.

The exhaust pipe 49 includes an upstream portion 49*a*, an intermediate portion 49*b*, and a downstream portion 49*c*. The upstream portion 49*a* of the exhaust pipe 49 extends in the front-rear direction of the straddle-type vehicle 1*b* on an upstream side of the intermediate portion 49*b*. The upstream portion 49*a* of the first exhaust assembly 47 is disposed on the left side of the straddle-type vehicle 1*b*. The downstream portion 49*c* of the exhaust pipe 49 is disposed at a position opposite to the upstream portion 49*a* with respect to a center line L9 of the straddle-type vehicle 1*b* in the left-right direction of the straddle-type vehicle 1*b*, and extends in the front-rear direction of the straddle-type vehicle 1*b* on a downstream side of the intermediate portion 49*b*. The downstream portion 49*c* is disposed on the right side of the straddle-type vehicle 1*b*. The intermediate portion 49*b* is disposed at a position on an upstream side of the muffler 50. The muffler 50 is connected to a downstream end portion of the downstream portion 49*c* of the exhaust pipe 49. Therefore, the muffler 50 is disposed at a position opposite to the upstream portion 49*a* with respect to the center line L9 of the straddle-type vehicle 1*b* in the left-right direction of the straddle-type vehicle 1*b*.

The intermediate portion 49*b* extends from one side to the other side of the straddle-type vehicle 1*b* through the center line L9, and in the present embodiment, the intermediate portion 49*b* extends from the left side to the right side of the straddle-type vehicle 1*b* as the intermediate portion 49*b* extends toward the downstream side. Accordingly, the intermediate portion 49*b* extends in the left-right direction to stretch between the upstream portion 49*a* and the downstream portion 49*c*.

In the present embodiment, the exhaust pipe 49 is connected to the exhaust port of the internal combustion engine E at a position on the left side in the left-right direction, extends downward therefrom, and then extends rearward in the front-rear direction of the straddle-type vehicle 1*b*. When the exhaust pipe 49 reaches an intermediate position in the front-rear direction, the exhaust pipe 49 is bent to extend from the left side to the right side in the left-right direction of the straddle-type vehicle 1*b* as the exhaust pipe 49 extends toward the downstream side from the intermediate position. The exhaust pipe 49 extends toward the right side in the left-right direction of the straddle-type vehicle 1*b*, and when reaching the position of the downstream portion 49*c*, the exhaust pipe 49 is bent to extend rearward in the front-rear direction of the straddle-type vehicle 1*b*.

The catalyst 51 is housed inside the intermediate portion 49*b* of the exhaust pipe 49. In the present embodiment, in the intermediate portion 49*b* of the exhaust pipe 49, the catalyst 51 is filled in a portion in which a flow passage axis line L10 extends along the left-right direction of the straddle-type vehicle 1*b*.

The second exhaust assembly 48 includes an exhaust pipe 52, a muffler 53, and a catalyst 54. The exhaust pipe 52 is connected to the exhaust port of the internal combustion engine E and extends downward from the exhaust port, changes a direction thereof rearward in the front-rear direction below the internal combustion engine E, and then extends rearward therefrom.

The exhaust pipe 52 includes an upstream portion 52*a*, an intermediate portion 52*b*, and a downstream portion 52*c*.

The upstream portion 52*a* of the exhaust pipe 52 extends in the front-rear direction of the straddle-type vehicle 1*b* on an upstream side of the intermediate portion 52*b*. The upstream portion 52*a* of the second exhaust assembly 48 is disposed on the right side of the straddle-type vehicle 1*b*. The downstream portion 52*c* of the exhaust pipe 52 is disposed at a position opposite to the upstream portion 52*a* with respect to the center line L9 of the straddle-type vehicle 1*b* in the left-right direction of the straddle-type vehicle 1*b*, and extends in the front-rear direction of the straddle-type vehicle 1*b* on the downstream side of the intermediate portion 52*b*. In the present embodiment, the downstream portion 52*c* is disposed on the left side of the straddle-type vehicle 1*b*. The intermediate portion 52*b* is disposed at a position on the upstream side of the muffler 53. The muffler 53 is connected to a downstream end portion of the downstream portion 52*c* of the exhaust pipe 52. Therefore, the muffler 53 is disposed at a position opposite to the upstream portion 52*a* with respect to the center line L9 of the straddle-type vehicle 1*b* in the left-right direction of the straddle-type vehicle 1*b*.

The intermediate portion 52*b* extends from the other side to one side of the straddle-type vehicle 1*b* through the center line L9, and in the present embodiment, the intermediate portion 52*b* extends from the right side to the left side of the straddle-type vehicle 1*b* as the intermediate portion 52*b* extends toward the downstream side. Accordingly, the intermediate portion 52*b* extends in the left-right direction to stretch between the upstream portion 52*a* and the downstream portion 52*c*. The intermediate portion 52*b* of the exhaust pipe 52 is disposed to be displaced in the front-rear direction of the vehicle with respect to the intermediate portion 49*b* of the exhaust pipe 49. The intermediate portion 52*b* of the exhaust pipe 52 may be disposed to be displaced in the upper-lower direction of the vehicle with respect to the intermediate portion 49*b* of the exhaust pipe 49. The intermediate portion 52*b* of the exhaust pipe 52 may be disposed to be displaced in both the upper-lower direction of the vehicle and the front-rear direction of the vehicle with respect to the intermediate portion 49*b* of the exhaust pipe 49.

In the present embodiment, the exhaust pipe 52 is connected to the exhaust port of the internal combustion engine E at a position on the right side in the left-right direction, extends downward therefrom, and then extends rearward in the front-rear direction of the straddle-type vehicle 1*b*. When the exhaust pipe 52 reaches an intermediate position in the front-rear direction, the exhaust pipe 52 is bent to extend from the right side to the left side in the left-right direction of the straddle-type vehicle 1*b* as the exhaust pipe 52 extends toward the downstream side from the intermediate position. The exhaust pipe 52 extends toward the left side in the left-right direction of the straddle-type vehicle 1*b*, and when reaching the position of the downstream portion 52*c*, the exhaust pipe 52 is bent to extend rearward in the front-rear direction of the straddle-type vehicle 1*b*.

The catalyst 54 is housed inside the intermediate portion 52*b* of the exhaust pipe 52. In the present embodiment, in the intermediate portion 52*b* of the exhaust pipe 52, the catalyst 54 is filled in a portion in which a flow passage axis line L11 extends along the left-right direction of the straddle-type vehicle 1*b*.

According to the present embodiment, the exhaust pipe 49 of the first exhaust assembly 47 and the exhaust pipe 52 of the second exhaust assembly 48 are arranged to intersect with each other as a whole, and thus it is possible to improve a degree of freedom in layout relating to each of the catalysts 51 and 54. Further, the intermediate portion 49*b* of the exhaust pipe 49 of the first exhaust assembly 47 and the intermediate portion 52*b* of the exhaust pipe 52 of the second exhaust assembly 48 can be disposed at substantially the same position in the front-rear direction. Therefore, a space in the straddle-type vehicle 1*b* can be efficiently used.

As described above, the above-described embodiments have been described as examples of the technique disclosed in the present application. However, the technique disclosed in the present disclosure is not limited thereto, and is also applicable to embodiments in which changes, replacements, additions, omissions, and the like are appropriately performed. In addition, it is also possible to combine constituent elements described in the above-described embodiments to provide a new embodiment. For example, a part of a configuration or a method in one embodiment may be applied to another embodiment, and a part of a configuration in one embodiment may be freely separated and extracted from another configuration in the embodiment. Further, the constituent elements described in the accompanying drawings and the detailed description include not only constituent elements essential for solving the problem but also constituent elements that are not essential for solving the problem in order to illustrate the technique.

The following aspects are described as preferred embodiments of the present disclosure.

According to a first aspect of the present disclosure, a straddle-type vehicle includes: a vehicle body frame including an engine mounting frame; an internal combustion engine mounted on the engine mounting frame and having an intake port and an exhaust port; a swing arm extending rearward from the engine mounting frame and having a front end portion pivotally supported by a pivot shaft at a rear portion of the engine mounting frame; a rear wheel connected to a rear end portion of the swing arm; and at least one exhaust assembly including an exhaust pipe connected to the exhaust port of the internal combustion engine, a muffler connected to the exhaust pipe, and at least one catalyst housed in an intermediate portion of the exhaust pipe on an upstream side of the muffler. The pivot shaft is disposed higher than a lower portion of the engine mounting frame. The catalyst is disposed in front of the rear wheel, behind the internal combustion engine, and below the swing arm.

According to a second aspect of the present disclosure, in the straddle-type vehicle according to the first aspect, the exhaust pipe further includes an upstream portion extending in a front-rear direction of the vehicle on an upstream side of the intermediate portion and a downstream portion extending in the front-rear direction of the vehicle on a downstream side of the intermediate portion. The intermediate portion is disposed at a position closer to a center line extending in the front-rear direction of the vehicle than at least one of the upstream portion and the downstream portion in a left-right direction of the vehicle.

According to a third aspect of the present disclosure, in the straddle-type vehicle according to the second aspect, the intermediate portion of the exhaust pipe includes a portion in which the catalyst is filled, and a flow passage axis line of the portion extends along the left-right direction of the vehicle.

According to a fourth aspect of the present disclosure, in the straddle-type vehicle according to any one of the first to third aspects, the upstream portion and the downstream portion are disposed on one side in the left-right direction. The intermediate portion of the exhaust pipe includes: a first portion connected to the upstream portion and extending from the upstream portion toward the other side in the left-right direction; a second portion curved from the first portion; and a third portion extending from the second portion toward the one side in the left-right direction and connected to the downstream portion.

According to a fifth aspect of the present disclosure, in the straddle-type vehicle according to the fourth aspect, the at least one catalyst includes: a first catalyst housed in the first portion of the intermediate portion; and a second catalyst housed in the third portion of the intermediate portion.

According to a sixth aspect of the present disclosure, in the straddle-type vehicle according to the fourth or fifth aspect, the first portion and the third portion are disposed at different heights from one another.

According to a seventh aspect of the present disclosure, in the straddle-type vehicle according to the sixth aspect, the third portion is disposed higher than the first portion.

According to an eighth aspect of the present disclosure, the straddle-type vehicle according to any one of the fourth to seventh aspects further includes: a side cover covering the upstream portion and the downstream portion from the one side in the left-right direction across the upstream portion and the downstream portion. The side cover covers a void between the first portion and the third portion from the one side in the left-right direction.

According to a ninth aspect of the present disclosure, the straddle-type vehicle according to the eighth aspect further includes: a step on which a foot of a rider is placed. The step is disposed on the one side in the left-right direction with respect to the side cover, and is disposed vertically above the side cover in a side view of the vehicle.

According to a tenth aspect of the present disclosure, in the straddle-type vehicle according to any one of the first to ninth aspects, the exhaust pipe includes a curved corner portion connecting the upstream portion to the intermediate portion. A flow passage cross-sectional area of the curved corner portion increases toward a downstream side in at least a part of the corner portion along a flow passage axis line.

According to an eleventh aspect of the present disclosure, the straddle-type vehicle according to any one of the first to tenth aspects further includes: a heat shielding cover covering the intermediate portion of the exhaust pipe. The heat shielding cover is disposed to have a gap to the intermediate portion.

According to a twelfth aspect of the present disclosure, the straddle-type vehicle according to any one of the first to eleventh aspects further includes: an oxygen sensor disposed on a downstream side of the catalyst. The oxygen sensor is attached to the intermediate portion of the exhaust pipe.

According to a thirteenth aspect of the present disclosure, in the straddle-type vehicle according to any one of the first to twelfth aspects, the at least one exhaust assembly includes a first exhaust assembly and a second exhaust assembly disposed each on a left side and a right side of the vehicle. The intermediate portion of the exhaust pipe of the first exhaust assembly and the intermediate portion of the exhaust pipe of the second exhaust assembly face each other in the left-right direction of the vehicle.

According to a fourteenth aspect of the present disclosure, in the straddle-type vehicle according to the third aspect, the at least one exhaust assembly includes a first exhaust assembly and a second exhaust assembly. In the exhaust pipe of the first exhaust assembly, the upstream portion is disposed on a left side of the vehicle, the downstream portion is disposed on a right side of the vehicle, and the intermediate portion extends in the left-right direction of the vehicle. In the exhaust pipe of the second exhaust assembly, the upstream portion is disposed on the right side of the vehicle, the downstream portion is disposed on the left side of the vehicle, and the intermediate portion extends in the left-right direction of the vehicle.

What is claimed is:

1. A straddle-type vehicle comprising:

a vehicle body frame including an engine mounting frame;

an internal combustion engine mounted on the engine mounting frame and having an intake port and an exhaust port;

a swing arm extending rearward from the engine mounting frame and having a front end portion pivotally supported by a pivot shaft at a rear portion of the engine mounting frame;

a rear wheel connected to a rear end portion of the swing arm; and at least one exhaust assembly including an exhaust pipe connected to the exhaust port of the internal combustion engine, a muffler connected to the exhaust pipe, and at least one catalyst housed in an intermediate portion of the exhaust pipe on an upstream side of the muffler, the at least one catalyst including a first catalyst and a second catalyst, wherein the pivot shaft is disposed higher than a lower portion of the engine mounting frame, the first catalyst and the second catalyst are disposed in front of the rear wheel, behind the internal combustion engine, and below the swing arm, the exhaust pipe further includes an upstream portion extending in a front-rear direction of the vehicle on an upstream side of the intermediate portion and a downstream portion extending in the front-rear direction of the vehicle on a downstream side of the intermediate portion, the upstream portion and the downstream portion are disposed on one side in a left-right direction of the vehicle, the intermediate portion of the exhaust pipe includes:

a first portion connected to the upstream portion and extending from the upstream portion toward an other side in the left-right direction of the vehicle, the first portion containing the first catalyst inside of the first portion;

a second portion curved rearward from the first portion; and a third portion extending from the second portion toward the one side in the left-right direction of the vehicle and connected to the downstream portion, the third portion being disposed more rearward than the first portion, the third portion containing the second catalyst inside of the third portion, and a flow passage axis line of the first portion and a flow passage axis line of the third portion are disposed at different heights from each other.

2. The straddle-type vehicle according to claim 1, wherein the intermediate portion is disposed at a position closer to a center line extending in the front-rear direction of the vehicle than at least one of the upstream portion and the downstream portion in the left-right direction of the vehicle.

3. The straddle-type vehicle according to claim 1, wherein the third portion is disposed higher than the first portion.

4. The straddle-type vehicle according to claim 1, further comprising:

a side cover covering the upstream portion and the downstream portion from the one side in the left-right direction across the upstream portion and the downstream portion, wherein the side cover covers a void between the first portion and the third portion from the one side in the left-right direction.

5. The straddle-type vehicle according to claim 4, further comprising:

a step on which a foot of a rider is placed, wherein the step is disposed on the one side in the left-right direction with respect to the side cover, and is disposed vertically above the side cover in a side view of the vehicle.

6. The straddle-type vehicle according to claim 1, wherein the exhaust pipe includes a curved corner portion connecting the upstream portion to the intermediate portion, and a flow passage cross-sectional area of the curved corner portion increases toward a downstream side in at least a part of the corner portion along the flow passage axis line.

7. The straddle-type vehicle according to claim 1, further comprising:

a heat shielding cover covering the intermediate portion of the exhaust pipe, wherein the heat shielding cover is disposed to have a gap to the intermediate portion.

8. The straddle-type vehicle according to claim 1, further comprising:

an oxygen sensor disposed on an upstream side of the first catalyst and the second catalyst, wherein the oxygen sensor is attached to the intermediate portion of the exhaust pipe.

9. A straddle-type vehicle comprising:

a vehicle body frame including an engine mounting frame;

an internal combustion engine mounted on the engine mounting frame and having an intake port and an exhaust port;

a swing arm extending rearward from the engine mounting frame and having a front end portion pivotally supported by a pivot shaft at a rear portion of the engine mounting frame;

a rear wheel connected to a rear end portion of the swing arm; and at least one exhaust assembly including an exhaust pipe connected to the exhaust port of the internal combustion engine, a muffler connected to the exhaust pipe, and at least one catalyst housed in an intermediate portion of the exhaust pipe on an upstream side of the muffler, the at least one catalyst including a first catalyst and a second catalyst, wherein the pivot shaft is disposed higher than a lower portion of the engine mounting frame, the first catalyst and the second catalyst are disposed in front of the rear wheel, behind the internal combustion engine, and below the swing arm, the at least one exhaust assembly includes a first exhaust assembly and a second exhaust assembly disposed each on a left side and a right side of the vehicle, the intermediate portion of the exhaust pipe of the first exhaust assembly contains the first catalyst inside of a portion of the intermediate portion extending along a left-right direction of the vehicle such that an inlet and an outlet of the first catalyst face in the left-right direction, the intermediate portion of the exhaust pipe of the second exhaust assembly contains the second catalyst inside of a portion of the intermediate portion extending along the left-right direction of the vehicle such that an inlet and an outlet of the second catalyst face in the left-right direction, and the intermediate portion of the exhaust pipe of the first exhaust assembly and the intermediate portion of the exhaust pipe of the second exhaust assembly face or are brought into contact with each other at a position of a center line extending a front-rear direction of the vehicle.

10. A straddle-type vehicle comprising:

a vehicle body frame including an engine mounting frame;

an internal combustion engine mounted on the engine mounting frame and having an intake port and an exhaust port;

a swing arm extending rearward from the engine mounting frame and having a front end portion pivotally supported by a pivot shaft at a rear portion of the engine mounting frame;

a rear wheel connected to a rear end portion of the swing arm; and at least one exhaust assembly including an exhaust pipe connected to the exhaust port of the internal combustion engine, a muffler connected to the exhaust pipe, and at least one catalyst housed in an intermediate portion of the exhaust pipe on an upstream side of the muffler, the at least one catalyst including a first catalyst and a second catalyst, wherein the pivot shaft is disposed higher than a lower portion of the engine mounting frame, the first catalyst and the second catalyst are disposed in front of the rear wheel, behind the internal combustion engine, and below the swing arm, the at least one exhaust assembly includes a first exhaust assembly and a second exhaust assembly, in the exhaust pipe of the first exhaust assembly, an upstream portion is disposed on a left side of the vehicle, a downstream portion is disposed on a right side of the vehicle, and the intermediate portion extends in a left-right direction of the vehicle, in the exhaust pipe of the second exhaust assembly, the upstream portion is disposed on the right side of the vehicle, the downstream portion is disposed on the left side of the vehicle, and the intermediate portion extends in the left-right direction of the vehicle, the exhaust pipe of the first exhaust assembly contains the first catalyst inside, and the exhaust pipe of the second exhaust assembly contains the second catalyst inside, and a portion of the exhaust pipe of the first exhaust assembly which is located on an upstream side of the first catalyst and a portion of the exhaust pipe of the second exhaust assembly which is located on a downstream side of the second catalyst are disposed aligned with each other at a position in a front-rear direction of the vehicle.

* * * * *